United States Patent [19]
Baisch

[11] Patent Number: 5,803,385
[45] Date of Patent: Sep. 8, 1998

[54] CENTRIFUGAL BRAKE SYSTEM FOR FISHING REEL

[75] Inventor: Eric Karl Baisch, Phila., Pa.

[73] Assignee: Penn Fishing Tackle Manufacturing Company, Philadelphia, Pa.

[21] Appl. No.: 867,167

[22] Filed: Jun. 20, 1997

[51] Int. Cl.⁶ .............................................. A01K 89/0155
[52] U.S. Cl. .......................................... 242/289; 188/185
[58] Field of Search ............................. 242/289; 188/185

[56] References Cited

U.S. PATENT DOCUMENTS

5,372,324  12/1994  Sato ........................................ 242/289
5,393,005  2/1995  Nakajima ................................ 242/289

Primary Examiner—Katherine Matecki
Attorney, Agent, or Firm—Frank J. Benasutti

[57] ABSTRACT

A centrifugal brake system for a fishing reel is shown which has a rotatable adjusting knob 16 providing a surface 14 for engaging the shoulders 20 or 200 of a plurality of radially extendable brakes 12 to position some, all or none of those brakes radially; thus to provide for some, all or none of the brakes to impinge against a brake drum surface 22, depending on the position of the knob and its cam surface 14.

18 Claims, 8 Drawing Sheets

CENTRIFUGAL BRAKE SYSTEM FOR FISHING REEL

CROSS-REFERENCE TO RELATED APPLICATION

This application is a continuation-in-part of my prior co-pending Provisional Application No. 60/028,596 filed Oct. 16, 1996 entitled CENTRIFUGAL BLADE SYSTEM FOR FISHING REEL, for which priority is claimed and which is incorporated herein as if fully set forth.

TECHNICAL FIELD

This invention relates to centrifugal friction brake systems for fishing reels.

BACKGROUND ART

This invention is an improvement on an adjustable centrifugally actuated brake system such as the type comprising a rotary member rotatable in a spool transmission system and having a centrifugal brake, including a plurality of radially positioned, slidably mounted brake members and a brake shoe attached to the structure. Such a mechanism is shown, for example, in U.S. Pat. No. 5,393,005 dated Feb. 28, 1995 and issued to Hideki Nakajima. See, for example, FIGS. 2 and 7 showing the brake block 9 having flange piece 9A. The brake 9 may be retained in non-engagement with the brake shoe 14, FIG. 2, by pressing it radially inwardly so that the flange 9A is forced past the resilient inwardly depending member 13. Or if one wants to have that brake engage the shoe 14, one moves the brake member 9 past the resilient flange 13 so that it can slide between that member and the inwardly depending member 12. It will slide to make contact with the brake shoe 14 upon the application of centrifugal force.

Another such system is shown in U.S. Pat. No. 3,986,678, issued Oct. 19, 1996 to Andre' Coquelet, et al. See, for example, the brake member 12 shown in FIG. 2. This invention contemplates changing the inertia-blocks or brake members 12 in order to change the amount of braking. According to the inventor, the angler may use inertia-blocks of different masses and different material. To change the inertia-block the angler removes the spool from the reel, turns the cover by a sixth of a turn in either direction and then changes the brakes. The angler then turns the cover back and the spool is replaced within the reel.

Zebco® makes a reel which also has a centrifugal braking system. In accordance with Zebco's device, the braking members have outwardly extending centrifligal flanges which are retained in circular grooves; concentric with one another and the shaft. Adjustments in braking are made by disassembling the spool from the reel and individually moving brakes radially to different concentric grooves.

In such systems, braking force is increased or decreased as more or less brakes are brought into contact with the brake shoe, that is, the brakes are turned "on" when one or more brakes are in contact with the shoe and turned "off" when no brakes are in contact with the shoe.

DISCLOSURE OF INVENTION

In all the prior art devices of which I am aware, there is a need for manual manipulation of individual brake members. It's an object of this invention to eliminate that need. The present invention provides a means for adjusting the centrifugal brake force through a cam which can be rotated to various positions to turn "on" or "off" various numbers of the brakes. In accordance with my invention, the angler, upon disassembling the spool from the reel, simply grabs a knob with his or her fingers and rotates it. Within the knob, there is a cam surface upon which the shoulders of the brakes may or may not rest in their active position, i.e., when the spool is turning. When the knob is rotated, the surface engages the shoulders and moves them radially or disengages from the shoulders. The shoulders are similar to cam followers, except that in my invention, the cam surface may or may not provide "limits" to brake movement.

DESCRIPTION OF THE PREFERRED EMBODIMENT

Figure 1:
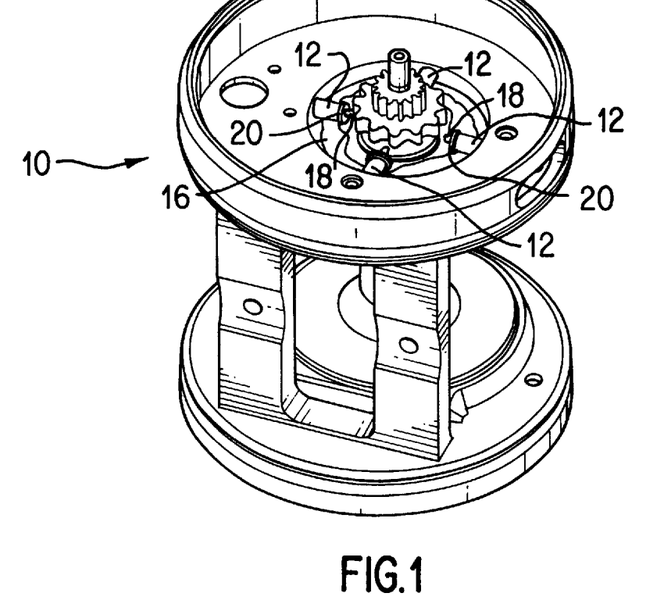
FIG. 1 is a perspective view of a portion of a fishing reel showing radially positioned brakes, a knob with an internal cam surface, and brake shoulders in position against said surface in accordance with this invention; with the brakes in an "all on" position.
Figure 2:
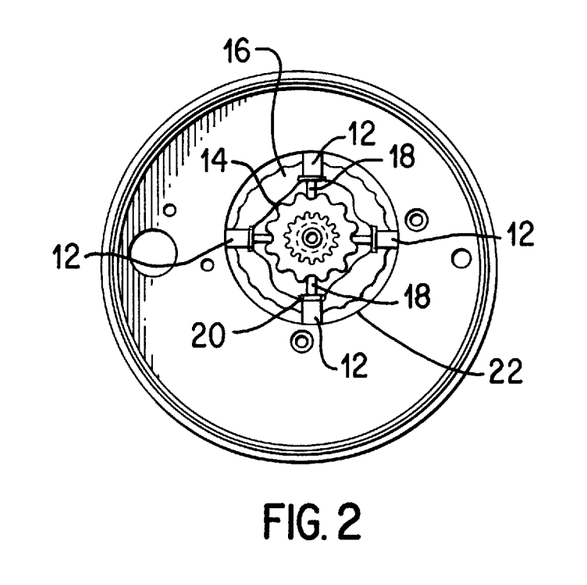
FIG. 2 is a top view of the device as shown in FIG. 1.
Figure 10:
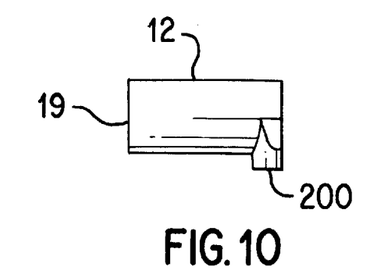
FIG. 10 is a side view of the device shown in FIG. 9.
Figure 19:
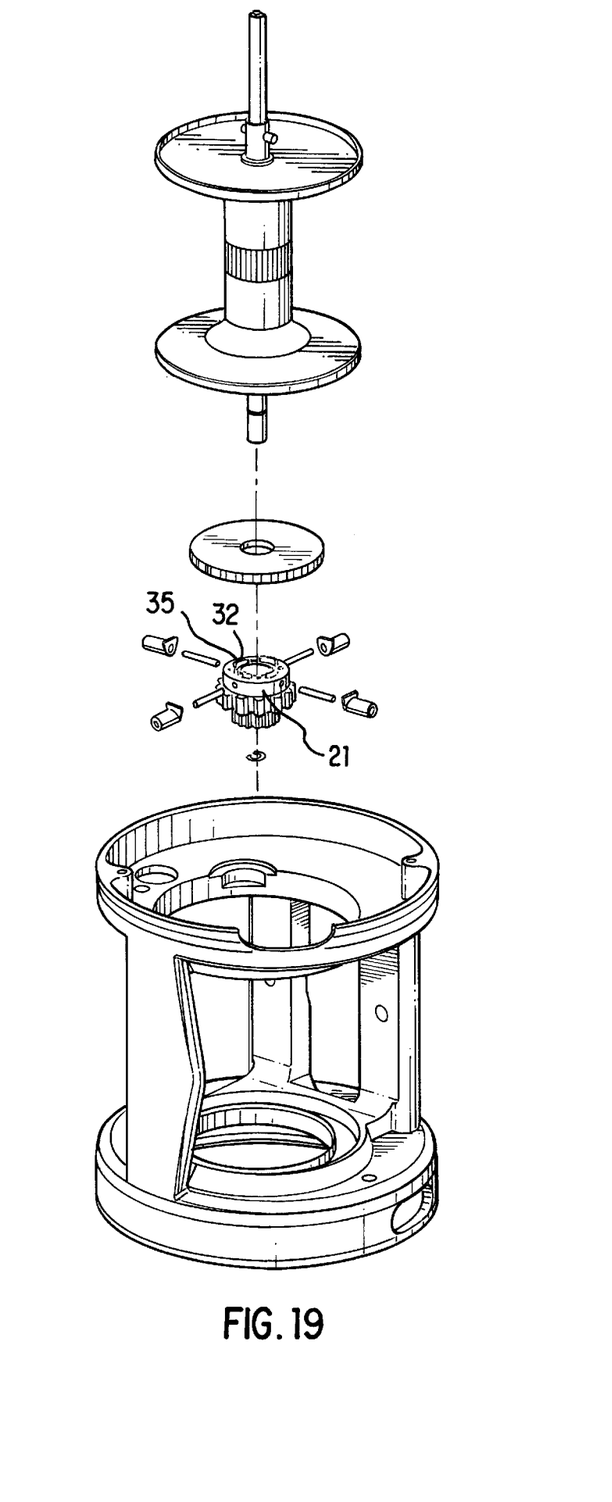
FIG. 19 is an exploded view showing the relationship between the parts shown in the previous Figures.
Figure 20:
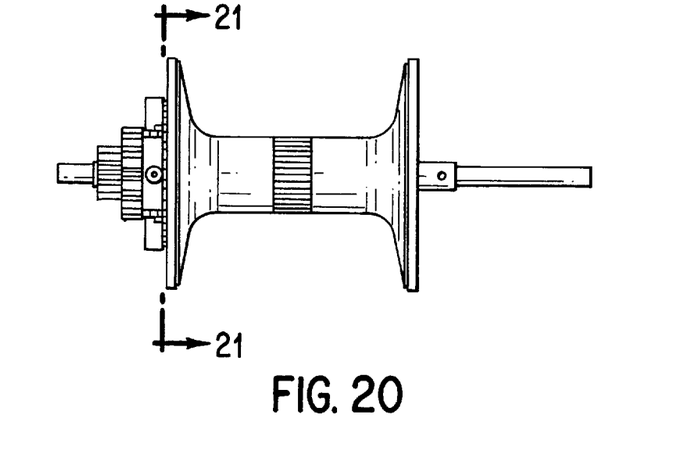
FIG. 20 is a side view of the assembled parts shown in the previous Figures.
Figure 21:
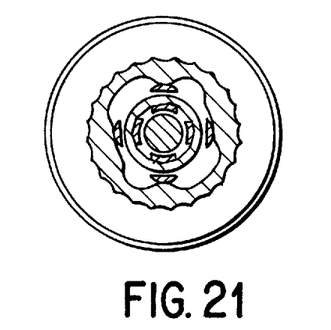
FIG. 21 is a section taken as indicated by the lines and arrows 21—21 in FIG. 20.

Referring to FIGS. 1 and 2, my improved centrifugal brake system is shown in the body of a fishing reel designated generally 10. This shows a plurality of brake members 12 in contact with the brake drum surface 22 and each having shoulders 20 for engaging the surface 14 of a knob 16. Each of the brake members 12 is generally cylindrical and is in sliding engagement with a radially extending pin 18 fixedly mounted to a ring 21, FIG. 19, and has an axially extending shoulder 20, FIG. 10, to engage the surface 14. The leading end 19, FIG. 10, of the brake member 12 engages the brake drum surface 22. In the position shown in FIGS. 1 and 2, all of the brakes are "on". Thus, the leading ends of all four brakes contact the brake drum surface for maximum spool braking. In this position, the surface 14 is sufficiently relieved to allow all of the brakes to extend fully into engagement with the drum 22.

Figure 3:
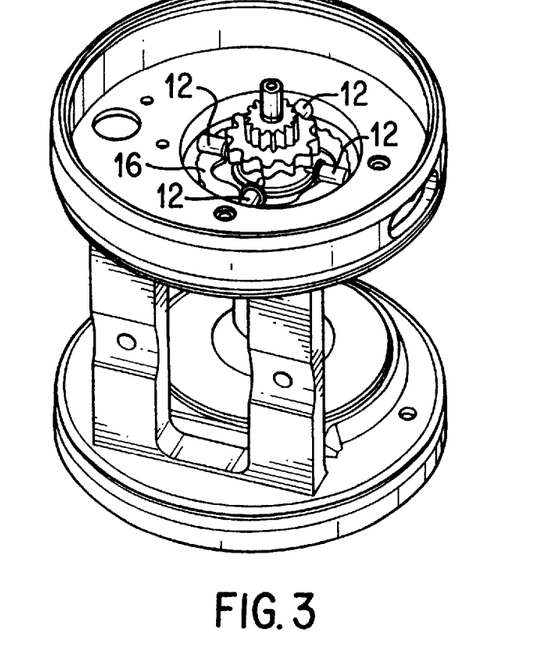
FIG. 3 is a perspective view of the device as shown in FIG. 1 with the parts reoriented.
Figure 4:
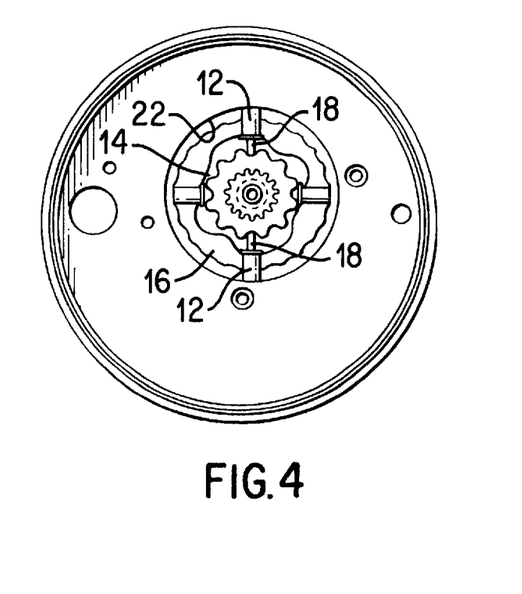
FIG. 4 is a top view of the device as shown in FIG. 3.
Figure 5:
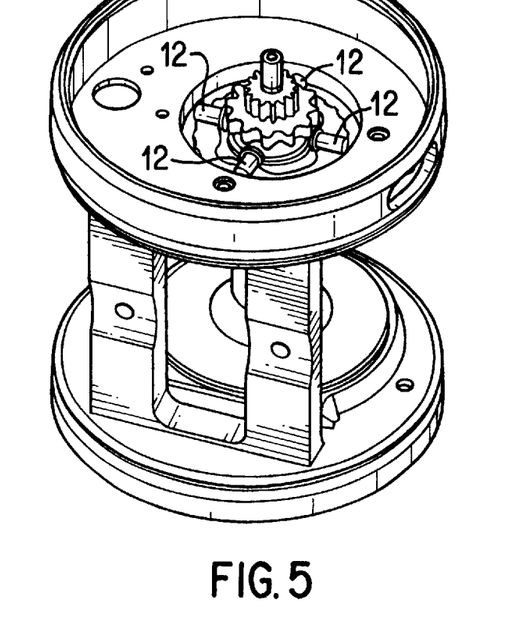
FIG. 5 is a perspective view of the device as shown in FIG. 1 with the parts reoriented.

FIGS. 3 and 4 show the position of the parts when the adjusting knob 16 is rotated 30 degrees counterclockwise and locks into a new position. As this rotation is in progress, the cam surface 14 engages the shoulders 20 of two of the brake members 12 and forces them radially inwardly. In this position, two brakes are "on" and two brakes are "off". As clearly shown, the top and bottom (when viewed as in FIG. 4) brakes still engage the brake drum surface 22, while the left and right brakes do not. This is because the surface 14 limits the travel of the horizontally disposed brake members 12; since the shoulders 20 of those brakes rest against the surface 14. Thus, the top and bottom are "on" and the left and right are "off".

Figure 6:
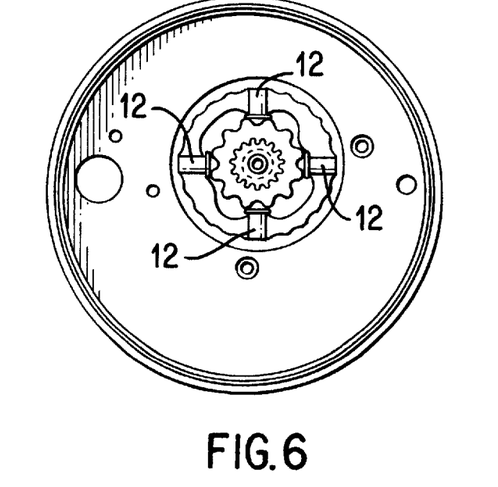
FIG. 6 is a top view of the device as shown in FIG. 5.

When the knob 16 is rotated an additional 30 degrees, the knob will lock into another position wherein all four brakes are "off", that is, not engaged with the brake drum surface 22 (as clearly shown in FIG. 6). As this rotation occurs, the cam surface engages the shoulders of the remaining two brake members and forces them radially inwardly. Thus, none of the brakes can act to slow the spool down by contacting the brake drum surface 22.

Figure 11:
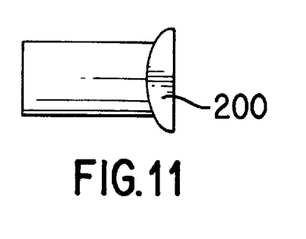
FIG. 11 is a bottom view of the device shown in FIG. 9.
Figure 12:
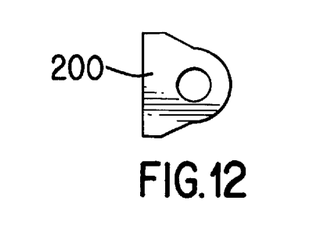
FIG. 12 is an end view of the device shown in FIG. 9.
Figure 13:
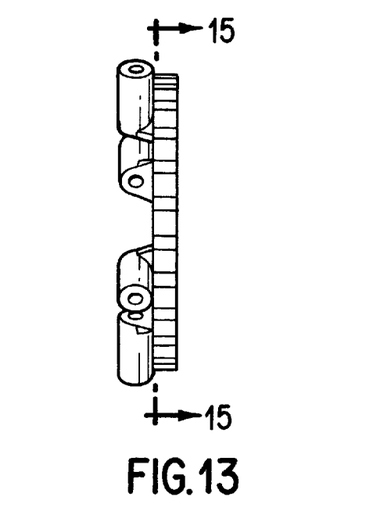
FIG. 13 is an enlarged edge view showing the relationship between the parts shown in FIGS. 1 through 12.
Figure 14:
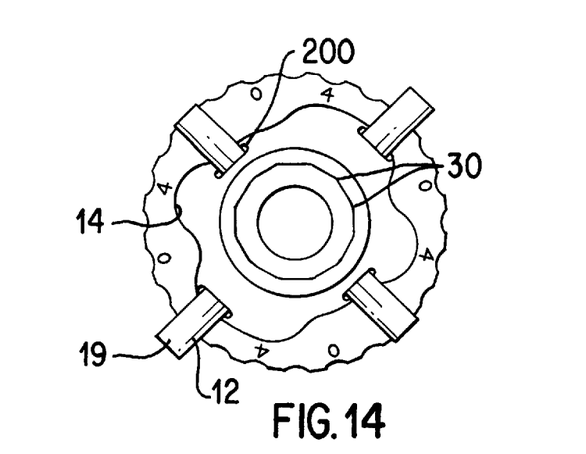
FIG. 14 is a side view taken from the left of the parts shown in FIG. 13.
Figure 15:
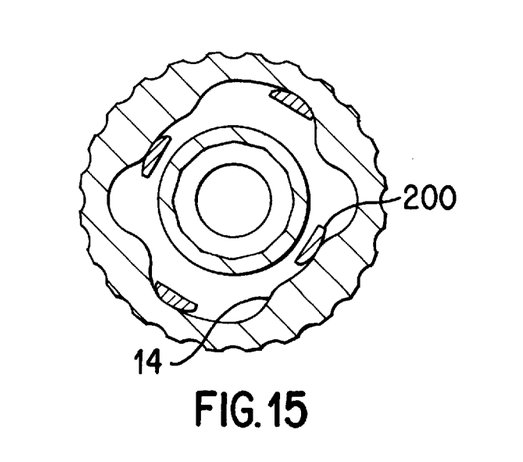
FIG. 15 is a section taken as indicated by the lines and arrows 15—15 in FIG. 13.

An individual brake member 12 is shown in greater detail in FIGS. 9 through 12. There it will be noted that the generally cylindrical brake member has a leading end 19 for engaging the brake shoe and a trailing end having a flange or shouldered portion 200; leading and trailing being relative terms having to do with the radial position of the brake member 12 on the pin 18. The shoulder or flange 200 is the preferred shape of the shoulder 20 shown in FIGS. 1 through 6. That pin 18 fits into the hole 23, FIG. 9, in sliding engagement, so that as centrifugal forces are applied, the brake member 12 moves radially outwardly preceded by the leading end 19 and followed by the trailing end flange 200. That flange is most preferably disposed along approximately 180 degrees of the trailing end of the brake member 12. Flange 200 has an arcuate shape as shown in FIG. 11. This arcuate shape provides for ease in movement along the surface 14 of the knob 16. That surface 14 is shown in greater detail in FIGS. 7, 8, 14 and 15. The position of the brake member 12 and, in particular, the relationship between its shoulder 200 and the arcuate surface thereof with respect to the surface 14 is shown in FIGS. 14 and 15.

Figure 16:
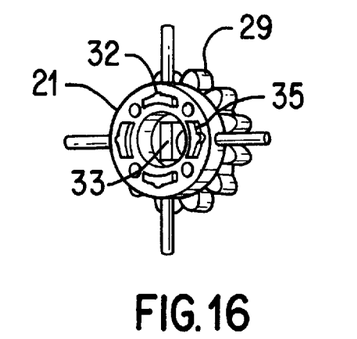
FIG. 16 is a perspective view of a portion of the device shown in FIG. 1.
Figure 17:
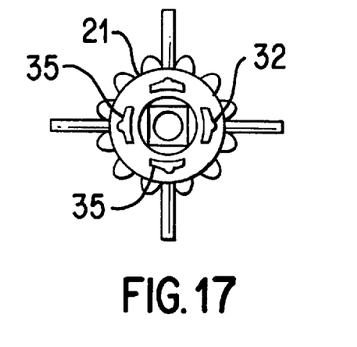
FIG. 17 is a front view of the device shown in FIG. 16.
Figure 18:
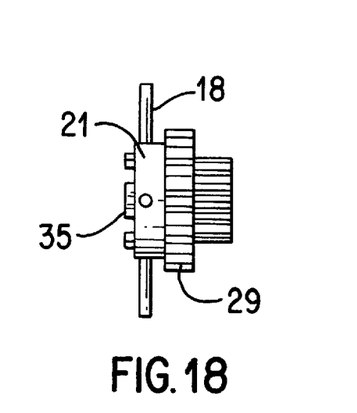
FIG. 18 is a side view of the device shown in FIG. 16.

As set forth above, when the knob 16 is rotated, it locks into different positions. This locking mechanism is provided by the slip ratchet means designated generally 27 in FIG. 22. This means is mounted to a gear 29 which has fixedly attached to it in any suitable manner a ring support 21, FIG. 18. The gear 29 has a square axial hole 33, FIG. 16, therein for mounting on a square portion of the spool shaft of the reel, to provide for rotation with and support on the shaft (not shown, but known in the art).

Figure 7:
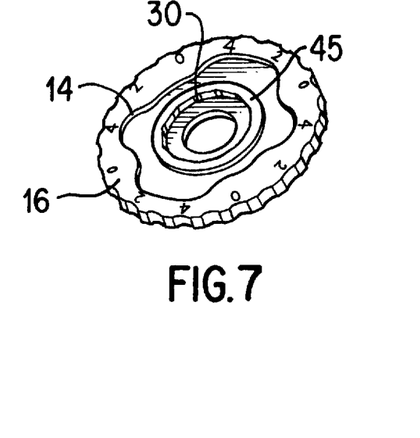
FIG. 7 is a perspective view of a portion of the apparatus shown in the previous Figures.
Figure 8:
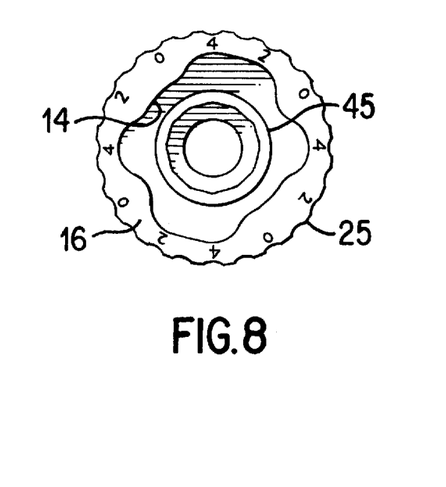
FIG. 8 is a plan view of the part shown in FIG. 7.
Figure 9:
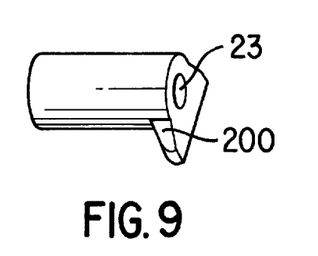
FIG. 9 is an enlarged perspective view of a brake member.
Figure 22:
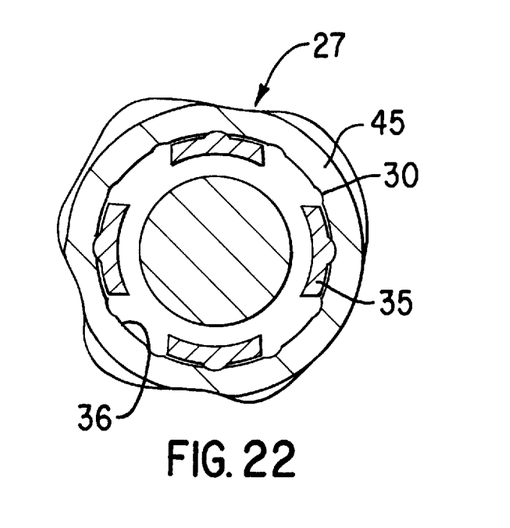
FIG. 22 is an enlarged detail of a portion of the parts shown in the center in FIG. 21.

The knob 16 has an axially concentrically disposed axially extending inner shoulder 45, FIGS. 7, 8 and 22. This shoulder's inner surface 36 has a plurality of detents 30 spaced thereabout at 30 degree intervals (see FIGS. 8, 14 and 22).

The ring 21, FIGS. 16 through 19, has a plurality of upraised lock members 35 extending axially therefrom. Each of these lock members has a protrusion 32, FIGS. 16 and 17, extending radially therefrom; positioned to engage a detent 30 within and along the inner surface 36 of the shoulder 45. Each protrusion 32 is positioned and dimension with respect to the detent 30 and the inner surface 36, such as to fit in what is known as an interference fit; as shown in detail in FIG. 22. In accordance with common engineering practices, an interference fit may be designed, and in this case is designed, such that the application of rotational force manually by the tips of the fingers of the angler on the knurled outside surface 25, FIG. 8, of the knob 16 will cause the detents 30 to move out of engagement with the protrusions 32 and those protrusions can thus be slipped along the surface 36 until the protrusion 32 slips into the next detent 30 and locks the knob 16 in the next position. Of course, this rotation can be moved past the next detent to the one following, such as, for example, if one wishes to move from the position shown in FIG. 1 to the position shown in FIG. 5 without permanently remaining in the position shown in FIG. 3.

The relative positioning of the protrusions with the detents is shown in the detail view, FIG. 22.

Thus, I have provided in a centrifugally actuated brake system of a fishing reel, having a brake drum attached to said reel, a rotary member rotatably mounted in said reel, and a centrifugal brake means mounted on said rotary member and having at least one brake member radially slidably mounted thereto to engage said brake drum upon the rotation of said rotary member, the improvement comprising: a position maintaining and adjusting means mounted in said reel for engaging said brake member and affecting the radial position of said brake member with respect to said drum, without manual manipulation of the brake member; said position maintaining and adjusting means, comprising an adjusting knob rotatably mounted in said reel and rotatable to a plurality of predetermined positions; a shoulder on said brake member; a cam surface means comprising a cam surface on said adjusting knob for engaging said shoulder and positioning said brake member radially by moving said member and/or providing an impediment to the radial outward movement of said brake member and/or not impeding said radial outward movement; upon rotation of said knob; and lock means to permit said knob to be rotated and to maintain said knob in said predetermined positions. In this system the lock means most preferably comprises at least one lock member fixedly attached to said rotary member; and engagement/disengagement means mounted on said knob to engage with and disengage from said lock member. Most preferably, the shoulder on said brake member is arcuate in shape along the portion thereof which is to be engaged by the cam surface.

The cam surface is so configured that in a first predetermined position all of said brake members are unimpeded thereby in radially outward movement and in a second predetermined position some of said brake members are unimpeded thereby in radially outward movement and others are not impeded thereby in radially outward movement and in a third predetermined position all of said brake members are impeded thereby in radially outward movement.

OPERATION

In operation, the rotation of the centrifugal-adjusting knob 16 makes for a smooth transition from either all brakes "on", all brakes "off", or some brakes "on", and some brakes "off"; without the need to manually manipulate individual brake members 12.

What I claim is:

1. In a centrifugally actuated brake system of a fishing reel, said system having a brake drum attached to said reel, a rotary member rotatably mounted in said reel, and a centrifugal brake means mounted on said rotary member and having at least one brake member radially slidably mounted thereto to engage said brake drum upon the rotation of said rotary member, the improvement comprising:

a position maintaining and adjusting means mounted in said reel for engaging said brake member and affecting the radial position of said brake member with respect to said drum, without manual manipulation of the brake member; said position maintaining and adjusting means, comprising:

i. an adjusting knob rotatably mounted in said reel and rotatable to a plurality of predetermined positions;

ii. a shoulder on said brake member;

iii. a cam surface means comprising a cam surface on said adjusting knob for engaging said shoulder and positioning said brake member radially by moving said member, and selectively either providing an impediment to the radial outward movement of said brake member or not impeding said radial outward movement; upon rotation of said knob; and iv. lock means to permit said knob to be rotated and to maintain said knob in said predetermined positions.

2. The system of claim 1 wherein said lock means comprises:

at least one lock member fixedly attached to said rotary member; and engagement/disengagement means mounted on said knob to engage with and disengage from said lock member.

3. The system of claim 2 wherein said lock member is in interference fit with said engagement/disengagement means.

4. The system of claim 3 wherein said lock member has a protrusion thereon and said engagement/disengagement means has a surface with a detent therein for engaging with said protrusion.

5. The system of claim 3 wherein said lock member has a protrusion thereon and said engagement/disengagement means has a surface with a plurality of detents therein for engaging with said protrusion in a plurality of positions of rotation of said knob.

6. The system of claim 1 wherein said shoulder on said brake member is arcuate in shape along the portion thereof which is to be engaged by the cam surface.

7. The system of claim 1 wherein said lock means comprises:

a plurality of lock members fixedly attached to said rotary member, each of said lock members having a protrusion thereon; and engagement/disengagement means mounted on said knob to engage with and disengage from said lock members; said lock members being in interference fit therewith; and said engagement/disengagement means has a surface with a plurality of detents therein for engaging with said protrusions in a plurality of positions of rotation of said knob.

8. In a centrifugally actuated brake system of a fishing reel, said system having a brake drum attached to said reel, a rotary member rotatably mounted in said reel, and a centrifugal brake means mounted on said rotary member and having plurality of brake members radially slidably mounted thereto to engage said brake drum upon the rotation of said rotary member, the improvement comprising:

a position maintaining and adjusting means mounted in said reel for engaging said brake members and affecting the radial position of said brake members with respect to said drum, without manual manipulation of the brake members; said position maintaining and adjusting means, comprising:

i. an adjusting knob rotatably mounted in said reel and rotatable to a plurality of predetermined positions;

ii. each of said brake members having a shoulder thereon;

iii. a cam surface means comprising a cam surface on said adjusting knob for engaging said shoulders and positioning said brake members radially by moving said members, and selectively either providing an impediment to the radial outward movement of said brake members or not impeding said radial outward movement; upon rotation of said knob; and iv. lock means to permit said knob to be rotated and to maintain said knob in said predetermined positions.

9. The system of claim 8 wherein said lock means comprises:

at least one lock member fixedly attached to said rotary member; and engagement/disengagement means mounted on said knob to engage with and disengage from said lock member.

10. The system of claim 9 wherein said lock member is in interference fit with said engagement/disengagement means.

11. The system of claim 10 wherein said lock member has a protrusion thereon and said engagement/disengagement means has a surface with a detent therein for engaging with said protrusion.

12. The system of claim 10 wherein said lock member has a protrusion thereon and said engagement/disengagement means has a surface with a plurality of detents therein for engaging with said protrusion in a plurality of positions of rotation of said knob.

13. The system of claim 8 wherein each of said shoulders on said brake members is arcuate in shape along the portion thereof which is to be engaged by the cam surface.

14. The system of claim 8 wherein said cam surface is so configured that in a predetermined position all of said brake members are unimpeded thereby in radially outward movement.

15. The system of claim 8 wherein the cam surface is so configured that in a predetermined position some of said brake members are unimpeded thereby in radially outward movement.

16. The system of claim 8 wherein the cam surface is so configured that in a first predetermined position all of said brake members are unimpeded thereby in radially outward movement and in a second predetermined position some of said brake members are unimpeded thereby in radially outward movement and others are not impeded thereby in radially outward movement.

17. The system of claim 8 wherein the cam surface is so configured that in a first predetermined position all of said brake members are unimpeded thereby in radially outward movement and in a second predetermined position some of said brake members are unimpeded thereby in radially outward movement and others are not impeded thereby in radially outward movement and in a third predetermined position all of said brake members are impeded thereby in radially outward movement.

18. The system of claim 8 wherein said lock means comprises:

a plurality of lock members fixedly attached to said rotary member, each of said lock members having a protrusion thereon; and engagement/disengagement means mounted on said knob to engage with and disengage from said lock members; said lock members being in interference fit therewith; and said engagement/disengagement means has a surface with a plurality of detents therein for engaging with said protrusions in a plurality of positions of rotation of said knob.

* * * * *